United States Patent [19]
Eckbreth et al.

[11] Patent Number: 4,705,367
[45] Date of Patent: Nov. 10, 1987

[54] VARIABLE FOCAL LENGTH OPTICAL SYSTEM HAVING A CONSTANT DIAMETER FOCAL SPOT

[75] Inventors: Alan C. Eckbreth, Glastonbury; John H. Stufflebeam, Manchester, both of Conn.

[73] Assignee: United Technologies Corporation, Hartford, Conn.

[21] Appl. No.: 863,213

[22] Filed: May 14, 1986

[51] Int. Cl.$^4$ .......................... G02B 9/16; G02B 27/00
[52] U.S. Cl. ..................................... 350/572; 350/415; 350/453; 350/462; 350/474; 350/518; 350/523; 350/563; 350/501; 219/121 LS; 219/121 LR; 219/121 LU; 362/259
[58] Field of Search ............... 350/572, 563, 523, 518, 350/453, 462, 474, 415, 174; 219/121 LS, 121 LR, 121 LU; 362/259

[56] References Cited
U.S. PATENT DOCUMENTS

| | | | |
|---|---|---|---|
| 1,095,285 | 5/1914 | Oliver | 350/518 |
| 4,209,225 | 6/1980 | Abe et al. | 350/518 |
| 4,318,585 | 3/1982 | Matsumura | 350/563 |
| 4,505,554 | 3/1985 | DeHubry | 350/518 |
| 4,526,443 | 7/1985 | Hirose | 350/415 |

*Primary Examiner*—Jon W. Henry
*Attorney, Agent, or Firm*—Eric W. Petraske

[57] ABSTRACT

An optical system for moving a focal point along an axis employs an input telescope having a variable lens separation and a fixed field lens separated from the telescope by the sum of the focal lengths of the field lens and the second lens of the telescope. The focal spot maintains a constant size as it moves. If two input beams are used, the crossing angle of the beams remains constant.

4 Claims, 2 Drawing Figures

VARIABLE FOCAL LENGTH OPTICAL SYSTEM HAVING A CONSTANT DIAMETER FOCAL SPOT

TECHNICAL FIELD

The field of the invention is that of optical systems for focusing beams of light from a collimated input beam to a focal spot of constant size positioned a variable distance from the system.

BACKGROUND ART

Most laser or other optical diagnostic techniques employ focused beams to achieve high spatial resolution and/or to provide sufficiently high light intensity to obtain a prescribed signal-to-noise ratio. Additionally, if an experimental system is to be mapped by translating the optical focal spot, it is usually important for consistent results that the focal spot maintain a constant size as it is moved about the experimental area. In the prior art, experimenters have used a typical four-element zoom lens, or, as illustrated in an article by T. J. Anderson, I. W. Kay, and W. T. Peschke, presented at the 22nd JANNAF Combustion Meeting at the California Institute of Technology in October, 1985, a field lens for focusing a collimated beam to a focal spot was physically translated, thereby moving the position of the focal spot. Alternatively, an entire optical apparatus was translated, as in the jet engine application described by Eckbreth, et al. in Applied Optics in May, 1984.

DISCLOSURE OF INVENTION

The invention relates to an optical system that receives an input optical beam in an input telescope having a single element that may be translated along the input beam direction. The output beam from that telescope is focused by a fixed-position field lens to a focal spot that varies along the beam axis by an amount that depends on the motion of the variable element of the input telescope.

A feature of the invention is that proper selection of the position of the input telescope compared to the position of the fixed field lens results in the focal spot having a constant size as it is moved about the experimental area.

Another feature of the invention is that the focusing is performed at constant f-number. Yet another feature of the invention is that the extremum rays of a light beam or pair of light beams maintain a constant crossing angle.

Yet another feature of the invention is that the focal spot moves a large distance in response to a small change in the position of the movable element of the input telescope.

BRIEF DESCRIPTION OF THE INVENTION

BEST MODE OF CARRYING OUT THE INVENTION

As was explained above, many optical systems require that an input beam be focused to a focal point that can be moved along an axis. Such systems are optical systems used in test devices for probing the focal area with an input beam of light and detecting light emitted from whatever medium is presented in the focal area. Another form of such optical system is used in laser machining or welding, in which a constant size focal point is desirable for consistent welding or machining results and must be moved through or along the workpiece. The prior art methods referred to above have the disadvantages of susceptibility to vibration, difficulty in moving lenses accurately over a relatively large distance and the requirement of moving two lenses simultaneously in a complicated, non-linear relationship.

Figure 1:
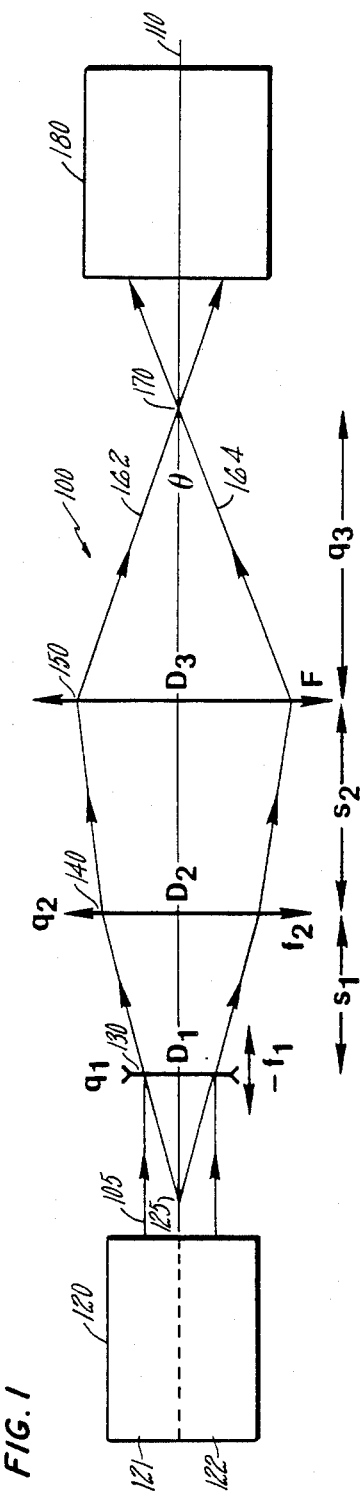
FIG. 1 illustrates schematically an embodiment of the invention.

Referring now to FIG. 1, there is illustrated an optical system 100 that receives an input laser beam 105 traveling along an axis 110. This input beam is illustrated schematically by a single laser 120 or, in an alternative embodiment, may be generated by two parallel beams produced by separate lasers or optical systems 121 and 122. The box labeled 120 is a schematic representation of a laser together with any other filters, lenses or other components required to generate the beam, as is known to those skilled in the art.

Beam 105 enters an input telescope comprising a diverging lens 130, labeled $q_1$ in the diagram and converging lens 140, labeled $q_2$ in the diagram. Lens 130 has a negative focal length $f_1$ and lens 140 has a positive focal length $f_2$. This particular arrangement is, as is well known to those skilled in the art, referred to as a Galilean telescope and has the property that the beam is expanded without the beam being focused to an intermediate focal spot. An alternative telescope, referred to as a Newtonian telescope, achieves the same result but with an intermediate focal spot. Both telescopes may be used in the invention, but the Galilean telescope is perferred for higher-power lasers. Lenses 130 and 140 are separated by a distance labeled $s_1$. Lens 140 is separated from a final field lens 150 by a second separation distance labeled $s_2$. Field lens 150 has a focal length referred to by F. The beam 105 is focused by field lens 150 to focal spot 170 with an angle of convergence given by the angle $\theta$ in the diagram. In the case of two separate beams, shown as 162 and 164 respectively, the angle $\theta$ is the angle between the two beams. A second optical system, indicated schematically by the box labeled 180, receives radiation emitted from the medium at focal spot 170. This radiation may be the same frequency as the input radiation in the case where a transmission measurement needs to be done, or it may be a different frequency in the case of a CARS or a Doppler-shifting system. The receiving system 180 need not be on the same axis 110 as that of the input beam 105 and may be placed at any convenient location.

The optical system 100 will now be analyzed to calculate the distance $q_3$ between field lens 150 and focal point 170 and the magnification from lens 130 to lens 150. Thin lens theory will be employed with object distances denoted by $p_i$, image distances $q_i$, focal lengths as denoted. Normal sign conventions will be followed, e.g., object distances positive to the left, image distances positive to the right, focal lengths are negative for diverging lenses. It is of interest to solve for the image distance from the field lens 150 together with the magnification of the beam on the field lens as a function of the various variables shown. For the first lens of the Galilean telescope, one has $$(1/p_1)+(1/q_1)=-(1/f_1) \tag{1}$$

Assuming collimated input laser beam(s), $p_1 = \infty$, $q_1 = -f_1$. Since $$p_2 = s_1 - q_1 = s_1 + f_1, \quad (2)$$

and $$(1/p_2) + (1/q_2) = (1/f_2) \quad (3)$$

one obtains $$q_2 = \frac{f_2(s_1 + f_1)}{s_1 + f_1 - f_2}, \quad (4)$$

Since $$p_3 = s_2 - q_2 \quad (5)$$

and $$(1/p_3) + (1/q_3) = (1/F) \quad (6)$$

$q_3$, the distance to the focal volume 170 from the field lens 150, can be shown to be $$q_3 = \frac{F[s_2(s_1 + f_1 - f_2) - f_2(s_1 + f_1)]}{(s_2 - F)(s_1 + f_1 - f_2) - f_2(s_1 + f_1)} \quad (7)$$

The magnification from lens 1 to lens 2 is $$M_{21} = \frac{D_2}{D_1} = \frac{f_1 + s_1}{f_1}. \quad (8)$$

The magnification of lens 2 to lens 3 is $$M_{32} = \frac{D_3}{D_2} = \frac{q_2 - s_2}{q_2}. \quad (9)$$

The magnification from lens 1 to lens 3 is thus $$M_{31} = M_{32}M_{21} = \frac{f_2(s_1 + f_1) + s_2(f_2 - f_1 - s_1)}{f_1 f_2}. \quad (10)$$

Since the separation distance of lens 140 and 150 is fixed at $s_2$, it can be seen from Eq. (7) that the distance of the focal point 170 depends only on $s_1$, the separation distance from input lens 130 to the second lens of the input telescope 140. Likewise, the magnification of the optical system depends only on the single variable $s_1$.

Figure 2:
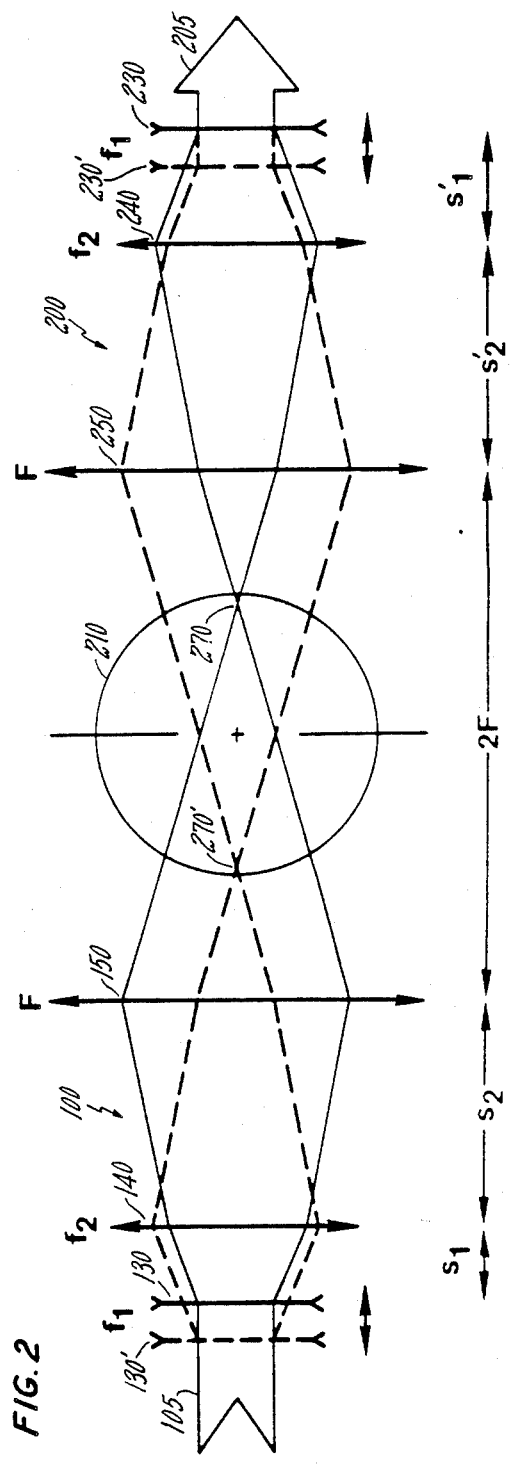
FIG. 2 illustrates schematically an embodiment of the invention having an additional optical system for receiving light emitted from the focal point.

The condition that the focal spot remain constant requires $\theta$ to be constant as the focal spot moves. Combining the system shown in FIG. 1 with a second similar system, as shown in FIG. 2, to analyze the light emitted from spot 170, requires the focusing angle $\theta$ of the beam converging or diverging from spot 170 be the same for the two cases. For $\theta$ to be constant, it must not be dependent on $s_1$. $\theta$ will remain constant if $M_{31}/q_3 = $ constant. (11)

Substituting Eqs. (7) and (10) into (11) leads to $$\theta \sim \frac{M_{31}}{q_3} = \frac{(s_2 - F)(f_2 - f_1) - s_1(s_2 - F - f_2) + f_1 f_2}{F f_1 f_2} \quad (12)$$

For $\theta$ to be constant, it must exhibit no $s_1$ dependence. This will occur if.

$$s_2 = F + f_2. \quad (13)$$

Inserting this back to Eq. (12) one obtains $$\frac{M_{31}}{q_3/F} = \frac{f_2}{f_1}. \quad (14)$$

System design proceeds by selecting an initial magnification for the input Galilean, $f_2/f_1$, to achieve the desired focal zone intensity for a field lens of focal length F. The focal zone intensity depends on the f/No. ($\sim \theta$) of the system and the diffraction, or uncorrectable divergence, properties of the laser beams employed. F is arbitrary but is typically selected to be of the order of the dimension to be probed, e.g., the furnace diameter, or the exhaust passage, Selection of $f_2$ and F then defines $s_2$. The separation of the field lenses is also arbitary but clearly depends on the dimension over which measurements are to be made. Separation of the field lenses then specifies that $$q_3 + q'_3 = kF, \quad (15)$$

where, for the solutions to be joined, kF is the separation of the field lenses, k being the number of focal lengths by which the field lenses are separated. In Eq. (15) $q'_3$ is the distance from the focal point 270 to the counterpart field lens 250. k need not be an integer. If one solves for $s_1$ through Eqs. (7) and (13), one obtains $$s_1 = f_2 - f_1 - \frac{f_2^2}{F}\left(\frac{q_3}{F} - 1\right). \quad (16)$$

Combining Eqs. (15) and (16), one finds $$s_1 + s'_1 = 2(f_2 - f_1) + \frac{f_2^2}{F}(2 - k). \quad (17)$$

Thus the sum of the separations of the input and output Galilean telescopes is equal to a constant. For a given separation of the input Galilean, the separation of the output Galilean is prescribed to achieve a collimated output. By differentiating Eq. (7) with respect to $s_1$, one can obtain the sensitivity of the focal point location to a change in separation of the input Galilean. Thus $$dq_3/ds_1 = -(F/f_2)^2 \quad (18)$$

Note that the change in focal point location $q_3$ is linearly proportional to the change in separation of the input Galilean telescope and of opposite sign. That is, the focal location moves away from the field lens as the Galilean separation decreases and vice versa. The focal zone location is also quite sensitive to the Galilean telescope separation. As an example of the leverage in the system, consider the case where F=1000 mm and $f_2$=100 mm. From Eq. (18), the change in the measurement point location is 100 times the separation change in the input Galilean telescope. A 1-mm separation change will move the measurement point 10 cm.

Referring to FIG. 2, an input system 100, essentially the same as the system of FIG. 1, accepts an input beam 105 and converges it to a focal spot, indicated by 270 and 270', as the two extreme positions of the focal point that may be achieved by translating lens 130 to the position indicated by 130′. This span range is indicated schematically by the circle 210 through which the focal spot may be moved. In this embodiment, the separation between the two field lenses 150 and 250 is given by 2F, i.e., twice the focal length of either of lenses 150 or 250. The analyzing optical system 200 is symmetric to system 100. In general, it need not be symmetric and the output beam 205 could be smaller or larger in diameter than input beam 105 and also could be converging or diverging instead of collimated. Output beam 205 will enter an analyzing system, such as that indicated schematically by 180, which would respond to the intensity and/or the frequency of the radiation emitting from the focal spot. In order to provide a consistent measurement as the focal spot moves through the test area 210, it is essentially required that the angle $\theta$ of both systems 100 and 200 be the same. As was shown in Eq. (17), the condition for equality of angle results in a condition that the sum of $s_1$ and $s_1'$ be a constant depending on the focal lengths of the system. In an actual system, this may be conveniently accomplished by mounting both lens 130 and 230 on separate stages, each of which is controlled by a stepper motor; by mounting both lenses 130 and 230 on a single mounting support that is translated; or by any other convenient means known to those skilled in the art.

We claim:

1. An optical system for focusing at least one collimated input optical beam traveling along an optical axis to a focal spot of constant size at a variable probe distance along said optical axis comprising;

a diverging input lens $q_1$ having a first focal length $f_1$ and being separated by a first variable separation distance $s_1$ along said optical axis from a converging second lens $q_2$, having a second focal length $f_2$ and being separated by a second separation length $s_2$ along said optical axis from a third lens having a third focal length F;

characterized in that said second separation length separating said second lens from said third lens is substantially equal to the sum of said second and third focal lengths;

and in that said first separation length separating said first and second lenses is a variable separation length, whereby said variable probe distance varies as a function of said first variable separation length.

2. An optical system for focusing at least one collimated input optical beam traveling along an optical axis to a focal spot of constant size at a variable probe distance along said optical axis comprising;

an input lens $q_1$ having a first focal length $f_1$ and being separated by a first variable separation distance $s_1$ along said optical axis from a second lens $q_2$, having a second focal length $f_2$ and being separated by a second separation length $s_2$ along said optical axis from a third lens having a third focal length F;

characterized in that said second separation length separating said second lens from said third lens is substantially equal to the sum of said second and third focal lengths;

said first separation length separating said first and second lenses is a variable separation length, whereby said variable probe distance varies as a function of said first variable separation length; and further including a collecting optical system for collecting optical radiation emanating from said focal spot comprising:

a counterpart third lens having said third focal length and being positioned along said optical axis passing through said focal spot;

a counterpart second lens having said second focal length and being positioned along said optical axis a distance from said counterpart third lens substantially equal to the sum of said second and third focal lengths;

a counterpart input lens having a said first focal length and being positioned along said optical axis a predetermined counterpart first variable separation distance from said counterpart second lens, further characterized in that the sum of said first and counterpart first variable separation distances is constant, whereby collimated radiation traveling along said first optical axis and entering said input lens produces corresponding collimated radiation exiting through said counterpart input lens.

3. An optical system according to claim 2, further characterized in that the sum of the distance along said first optical axis from said third lens to said focal spot and the distance along said second optical axis from said focal spot to said counterpart third lens is greater than said third focal length.

4. An optical system according to claim 2, further including first and second optical sources for generating first and second collimated input beams traveling parallel to said optical axis and being disposed at predetermined source positions displaced from said optical axis, whereby said first and second collimated input beams pass through said input lens, said second lens and said third lens and are each focused to first and second focal spots at said variable probe distance and having first and second focal spot displacement distances from said optical axis, said first and second focal spot displacement distances being on the opposite side of said optical axis from said first and second source positions, whereby first and second beams converging to said first and second focal spots cross at a variable crossing point along said optical axis that is related to said variable probe distance and and at a crossing angle that remains substantially constant as said variable probe distance is moved.

* * * * *